(12) United States Patent
Gan et al.

(10) Patent No.: US 12,519,937 B2
(45) Date of Patent: Jan. 6, 2026

(54) INTEGERIZATION FOR INTERPOLATION FILTER DESIGN IN VIDEO CODING

(71) Applicant: GUANGDONG OPPO MOBILE TELECOMMUNICATIONS CORP., LTD., Dongguan (CN)

(72) Inventors: Jonathan Gan, Palo Alto, CA (US); Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/842,334

(22) PCT Filed: Mar. 2, 2023

(86) PCT No.: PCT/US2023/063612
§ 371 (c)(1),
(2) Date: Aug. 28, 2024

(87) PCT Pub. No.: WO2023/168358
PCT Pub. Date: Sep. 7, 2023

(65) Prior Publication Data
US 2025/0193386 A1 Jun. 12, 2025

Related U.S. Application Data

(60) Provisional application No. 63/362,958, filed on Apr. 13, 2022, provisional application No. 63/362,824, (Continued)

(51) Int. Cl.
*H04N 19/117* (2014.01)
*H04N 19/136* (2014.01)
(Continued)

(52) U.S. Cl.
CPC ......... *H04N 19/117* (2014.11); *H04N 19/136* (2014.11); *H04N 19/172* (2014.11); *H04N 19/184* (2014.11); *H04N 19/52* (2014.11)

(58) Field of Classification Search
None
See application file for complete search history.

(56) References Cited

U.S. PATENT DOCUMENTS

RE48,308 E * 11/2020 Fiato .................. C10G 1/06
2009/0097547 A1 4/2009 Ugur et al.
(Continued)

OTHER PUBLICATIONS

International Search Report in the international application No. PCT/US2023/063612, mailed on Sep. 26, 2023, 2 pages.
(Continued)

*Primary Examiner* — Stuart D Bennett
(74) *Attorney, Agent, or Firm* — BAYES PLLC

(57) ABSTRACT

In some embodiments, a video encoder encodes a video into a video bitstream. The video encoder accesses a set of frames of the video and performs inter prediction for the set of frames using a set of integerized interpolation filters to generate prediction residuals to be encoded into the video bitstream. The set of integerized interpolation filters are generated by integerizing a set of interpolation filters, each of the set of interpolation filters having floating-point filter coefficients. For each interpolation filter, two integerized filter coefficient values are generated for each filter coefficient and a set of filter candidates are generated based on the two integerized values for each filter coefficient. An error metric for each filter candidate is calculated and an integerized interpolation filter having the lowest error metric is selected for the interpolation filter from the set of filter candidates.

20 Claims, 6 Drawing Sheets

Related U.S. Application Data filed on Apr. 11, 2022, provisional application No. 63/268,919, filed on Mar. 4, 2022.

(51) Int. Cl.
*H04N 19/172* (2014.01)
*H04N 19/184* (2014.01)
*H04N 19/52* (2014.01)

(56) References Cited

U.S. PATENT DOCUMENTS

| | | |
|---|---|---|
| 2012/0314771 A1 | 12/2012 | Lim |
| 2018/0098066 A1* | 4/2018 | Lee .................. H04N 19/59 |
| 2020/0244971 A1 | 7/2020 | Wang |
| 2020/0260108 A1 | 8/2020 | Chen et al. |
| 2021/0058627 A1* | 2/2021 | Wang ................ H04N 19/159 |
| 2021/0092438 A1* | 3/2021 | Luo .................. H04N 19/172 |
| 2021/0176486 A1 | 6/2021 | Wang et al. |
| 2021/0203928 A1* | 7/2021 | Filippov ............. H04N 19/593 |
| 2021/0227243 A1* | 7/2021 | Wu ................... H04N 19/176 |
| 2021/0337238 A1* | 10/2021 | Filippov ............. H04N 19/82 |
| 2022/0159249 A1* | 5/2022 | Taquet ............... H04N 19/70 |

OTHER PUBLICATIONS

Written Opinion of the International Search Authority in the international application No. PCT/US2023/063612, mailed on Sep. 26, 2023, 15 pages.

B. Bross, J. Chen, S. Liu, Y. K. Wang, "Versatile Video Coding Editorial Refinements on Draft 10", Document of Joint Video Experts Team of ITU-T SG 16 WP 3 and ISO/IEC JTC1/SC 29, JVET-T2001_v2, 20th Meeting by teleconference, Oct. 7-16, 2020, p. 12-511, 513 pages.

F. Bossen, B. Bross, T. Ikai, D. Rusanovskyy, G. Sullivan, Y. K. Wang, "VVC operationrange extensions (Draft 5)", Document of Joint Video Experts Team of ITU-T SG 16 WP 3 and ISO/IEC JTC 1/SC 29, JVET-X2005, 24th Meeting by teleconference, Oct. 6-15, 2021, the whole document, 32 pages.

\* cited by examiner

# INTEGERIZATION FOR INTERPOLATION FILTER DESIGN IN VIDEO CODING

CROSS-REFERENCE TO RELATED APPLICATIONS

This application is a national stage application of International Application No. PCT/US2023/063612, filed on Mar. 2, 2023, which claims priority to U.S. Provisional Application No. 63/268,919, entitled "Integerization Methods for Design of Interpolation Filters," filed on Mar. 4, 2022, U.S. Provisional Application No. 63/362,824, entitled "Integerization Methods for Design of Interpolation Filter," filed on Apr. 11, 2022, and U.S. Provisional Application No. 63/362,958, entitled "Integerization Methods for Design of Interpolation Filters," filed on Apr. 13, 2022. The disclosures of the above-referenced applications are hereby incorporated in their entirety by this reference.

TECHNICAL FIELD

This disclosure relates generally to video processing. Specifically, the present disclosure involves integerization for interpolation filter design in video coding.

BACKGROUND

The ubiquitous camera-enabled devices, such as smartphones, tablets, and computers, have made it easier than ever to capture videos or images. However, the amount of data for even a short video can be substantially large. Video coding technology (including video encoding and decoding) allows video data to be compressed into smaller sizes thereby allowing various videos to be stored and transmitted. Video coding has been used in a wide range of applications, such as digital TV broadcast, video transmission over the Internet and mobile networks, real-time applications (e.g., video chat, video conferencing), DVD and Blu-ray discs, and so on. To reduce the storage space for storing a video and/or the network bandwidth consumption for transmitting a video, it is desired to improve the efficiency of the video coding scheme.

SUMMARY

Some embodiments involve integerization for interpolation filter design in video coding. In one example, a method for encoding a video, the method includes accessing a plurality of frames of the video; and performing inter prediction for the plurality of frames using a set of integerized interpolation filters to generate prediction residuals for the plurality of frames. The set of integerized interpolation filters is generated by: accessing a set of interpolation filters, each of the set of interpolation filters having floating-point filter coefficients; for each interpolation filter in the set of interpolation filters, generating two integerized filter coefficient values for each filter coefficient of the interpolation filter, generating a set of filter candidates based on the two integerized filter coefficient values for each filter coefficient, calculating an error metric for each filter candidate in the set of filter candidates, and selecting an integerized interpolation filter for the interpolation filter from the set of filter candidates. The selected integerized interpolation filter has a lowest error metric among the set of filter candidates. The method further includes encoding the prediction residuals for the plurality of frames into a bitstream representing the video.

In another example, a non-transitory computer-readable medium has program code that is stored thereon. The program code is executable by one or more processing devices for performing operations The operations include accessing a plurality of frames of a video; and performing inter prediction for the plurality of frames using a set of integerized interpolation filters to generate prediction residuals for the plurality of frames. The set of integerized interpolation filters is generated by: accessing a set of interpolation filters, each of the set of interpolation filters having floating-point filter coefficients; for each interpolation filter in the set of interpolation filters, generating two integerized filter coefficient values for each filter coefficient of the interpolation filter, generating a set of filter candidates based on the two integerized filter coefficient values for each filter coefficient, calculating an error metric for each filter candidate in the set of filter candidates, and selecting an integerized interpolation filter for the interpolation filter from the set of filter candidates. The selected integerized interpolation filter has a lowest error metric among the set of filter candidates. The operations further include encoding the prediction residuals for the plurality of frames into a bitstream representing the video.

In another example, a system includes a processing device; and a non-transitory computer-readable medium communicatively coupled to the processing device. The processing device is configured to execute program code stored in the non-transitory computer-readable medium and thereby perform operations. The operations include accessing a plurality of frames of a video; and performing inter prediction for the plurality of frames using a set of integerized interpolation filters to generate prediction residuals for the plurality of frames The set of integerized interpolation filters is generated by: accessing a set of interpolation filters, each of the set of interpolation filters having floating-point filter coefficients; for each interpolation filter in the set of interpolation filters, generating two integerized filter coefficient values for each filter coefficient of the interpolation filter, generating a set of filter candidates based on the two integerized filter coefficient values for each filter coefficient, calculating an error metric for each filter candidate in the set of filter candidates, and selecting an integerized interpolation filter for the interpolation filter from the set of filter candidates. The selected integerized interpolation filter has a lowest error metric among the set of filter candidates. The operations further include encoding the prediction residuals for the plurality of frames into a bitstream representing the video.

In another example, a method for decoding a video from a video bitstream includes decoding one or more frames of the video from the video bitstream; and performing inter prediction based on the one or more frames using a set of integerized interpolation filters to decode another frame of the video. The set of integerized interpolation filters are generated by: accessing a set of interpolation filters, each of the set of interpolation filters having floating-point filter coefficients; for each interpolation filter in the set of interpolation filters, generating two integerized filter coefficient values for each filter coefficient of the interpolation filter, generating a set of filter candidates based on the two integerized filter coefficient values for each filter coefficient, calculating an error metric for each filter candidate in the set of filter candidates, and selecting an integerized interpolation filter for the interpolation filter from the set of filter candidates. The selected integerized interpolation filter has a lowest error metric among the set of filter candidates. The method further includes causing the decoded one or more frame and the decoded another frame to be displayed.

In another example, a non-transitory computer-readable medium having program code that is stored thereon and the program code is executable by one or more processing devices for performing operations. The operations include decoding one or more frames of a video from a video bitstream of the video; and performing inter prediction based on the one or more frames using a set of integerized interpolation filters to decode another frame of the video. The set of integerized interpolation filters are generated by: accessing a set of interpolation filters, each of the set of interpolation filters having floatingpoint filter coefficients; for each interpolation filter in the set of interpolation filters, generating two integerized filter coefficient values for each filter coefficient of the interpolation filter, generating a set of filter candidates based on the two integerized filter coefficient values for each filter coefficient, calculating an error metric for each filter candidate in the set of filter candidates, and selecting an integerized interpolation filter for the interpolation filter from the set of filter candidates. The selected integerized interpolation filter has a lowest error metric among the set of filter candidates. The operations further include causing the decoded one or more frame and the decoded another frame to be displayed.

In another example, a system includes a processing device; and a non-transitory computer-readable medium communicatively coupled to the processing device. The processing device is configured to execute program code stored in the non-transitory computer-readable medium and thereby perform operations. The operations include decoding one or more frames of a video from a video bitstream of the video; and performing inter prediction based on the one or more frames using a set of integerized interpolation filters to decode another frame of the video. The set of integerized interpolation filters are generated by: accessing a set of interpolation filters, each of the set of interpolation filters having floating-point filter coefficients; for each interpolation filter in the set of interpolation filters, generating two integerized filter coefficient values for each filter coefficient of the interpolation filter, generating a set of filter candidates based on the two integerized filter coefficient values for each filter coefficient, calculating an error metric for each filter candidate in the set of filter candidates, and selecting an integerized interpolation filter for the interpolation filter from the set of filter candidates. The selected integerized interpolation filter has a lowest error metric among the set of filter candidates. The operations further include causing the decoded one or more frame and the decoded another frame to be displayed.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
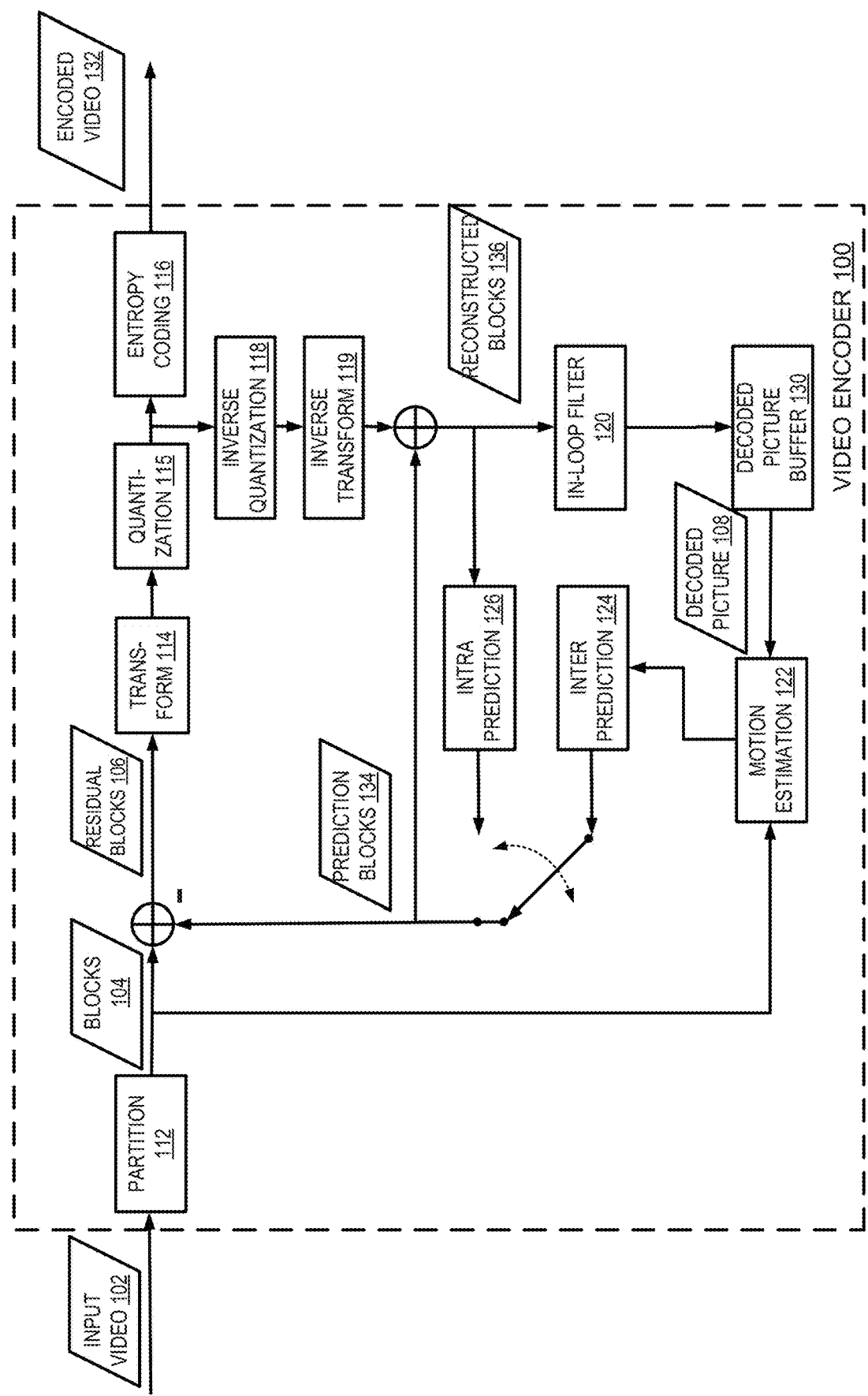
FIG. 1 is a block diagram showing an example of a video encoder configured to implement embodiments presented herein.

Various embodiments provide integerization for interpolation filter design used in motion compensation inter prediction of video coding. As discussed above, more and more video data are being generated, stored, and transmitted. It is beneficial to increase the efficiency of the video coding technology. One way to do so is through inter-prediction where the prediction of video pixels or samples in a current frame to be decoded uses pixels or samples from other frames which have already been reconstructed. To perform the inter prediction, it often involves using an interpolation filter to determine the prediction samples at the fractional-pel positions using value of samples at integer-pel positions.

Interpolation filter design methods typically generate filters with floating-point filter coefficients. Floating point calculations are undesirable for practical video coders because floating point operations may produce different results across different computing architectures. Such instability in floating point operations limits the interoperability of a video coding standard. Floating point operations are also more computationally expensive than integer multiplications. To implement a filter set designed by such methods in a practical video coding standard, it is necessary to convert the floating-point filter coefficients to a fixed-point representation with a desired number of bits. However, existing integerization methods merely use rounding operations which may cause the resulted filter to lose desirable properties, leading to inaccurate prediction and thus low coding efficiency.

Various embodiments described herein address these problems by proposing integerization mechanisms that are optimized for minimizing the interpolation error. For a given filter design method that produces a set of filters with floating-point filter coefficients, an initial set of filter candidates can be generated for each filter by considering that each filter coefficient may be integerized to two possible values: a ceiling value and to a floor value. The set of filter candidates can be evaluated according to an error metric and the filter candidate with the lowest error is selected as the integerization for that filter.

In one embodiment, the error measure is the squared error of the integerized filter coefficients from the scaled floating-point coefficients. In another embodiment, the error measure is calculated by approximating the integral of the spectral error between the frequency response of the filter candidate and the frequency response of an ideal interpolator. In a further embodiment, the error metric in any of the above embodiments is modified by applying an importance weighting to the error. In yet another embodiment, rather than selecting the filter candidate with lowest error for a particular error measure, a reduced set of filter candidates can be generated and tested in a video coding system to determine the final filter candidate.

As described herein, some embodiments provide improvements in video coding efficiency through integerization of the interpolation filter coefficients. By generating a set of filter candidates based on multiple possible integerized values and selecting the filter that minimizes the error metric, the error introduced by the integerization can be reduced and the property of the interpolation filter can be maintained as much as possible. As a result, prediction generated using the interpolation filters can be more accurate thereby improving the coding efficiency. The techniques can be an effective coding tool in future video coding standards.

Referring now to the drawings, FIG. 1 is a block diagram showing an example of a video encoder 100 configured to implement embodiments presented herein. In the example shown in FIG. 1, the video encoder 100 includes a partition module 112, a transform module 114, a quantization module 115, an inverse quantization module 118, an inverse transform module 119, an in-loop filter module 120, an intra prediction module 126, an inter prediction module 124, a motion estimation module 122, a decoded picture buffer 130, and an entropy coding module 116.

The input to the video encoder 100 is an input video 102 containing a sequence of pictures (also referred to as frames or images). In a block-based video encoder, for each of the pictures, the video encoder 100 employs a partition module 112 to partition the picture into blocks 104, and each block contains multiple pixels. The blocks may be macroblocks, coding tree units, coding units, prediction units, and/or prediction blocks. One picture may include blocks of different sizes and the block partitions of different pictures of the video may also differ. Each block may be encoded using different predictions, such as intra prediction or inter prediction or intra and inter hybrid prediction.

Usually, the first picture of a video signal is an intra-coded picture, which is encoded using only intra prediction. In the intra prediction mode, a block of a picture is predicted using only data that has been encoded from the same picture. A picture that is intra-coded can be decoded without information from other pictures. To perform the intra-prediction, the video encoder 100 shown in FIG. 1 can employ the intra prediction module 126. The intra prediction module 126 is configured to use reconstructed samples in reconstructed blocks 136 of neighboring blocks of the same picture to generate an intra-prediction block (the prediction block 134). The intra prediction is performed according to an intra-prediction mode selected for the block. The video encoder 100 then calculates the difference between block 104 and the intra-prediction block 134. This difference is referred to as residual block 106.

To further remove the redundancy from the block, the residual block 106 is transformed by the transform module 114 into a transform domain by applying a transform on the samples in the block. Examples of the transform may include, but are not limited to, a discrete cosine transform (DCT) or discrete sine transform (DST). The transformed values may be referred to as transform coefficients representing the residual block in the transform domain. In some examples, the residual block may be quantized directly without being transformed by the transform module 114. This is referred to as a transform skip mode.

The video encoder 100 can further use the quantization module 115 to quantize the transform coefficients to obtain quantized coefficients. Quantization includes dividing a sample by a quantization step size followed by subsequent rounding, whereas inverse quantization involves multiplying the quantized value by the quantization step size. Such a quantization process is referred to as scalar quantization. Quantization is used to reduce the dynamic range of video samples (transformed or non-transformed) so that fewer bits are used to represent the video samples.

The quantization of coefficients/samples within a block can be done independently and this kind of quantization method is used in some existing video compression standards, such as H.264, and HEVC. For an N-by-M block, some scan order may be used to convert the 2D coefficients of a block into a 1-D array for coefficient quantization and coding. Quantization of a coefficient within a block may make use of the scan order information. For example, the quantization of a given coefficient in the block may depend on the status of the previous quantized value along the scan order. In order to further improve the coding efficiency, more than one quantizer may be used. Which quantizer is used for quantizing a current coefficient depends on the information preceding the current coefficient in the encoding/decoding scan order. Such a quantization approach is referred to as dependent quantization.

The degree of quantization may be adjusted using the quantization step sizes. For instance, for scalar quantization, different quantization step sizes may be applied to achieve finer or coarser quantization. Smaller quantization step sizes correspond to finer quantization, whereas larger quantization step sizes correspond to coarser quantization. The quantization step size can be indicated by a quantization parameter (QP). Quantization parameters are provided in an encoded bitstream of the video such that the video decoder can access and apply the quantization parameters for decoding.

The quantized samples are then coded by the entropy coding module 116 to further reduce the size of the video signal. The entropy encoding module 116 is configured to apply an entropy encoding algorithm to the quantized samples. In some examples, the quantized samples are binarized into binary bins and coding algorithms further compress the binary bins into bits. Examples of the binarization methods include, but are not limited to, a combined truncated Rice (TR) and limited k-th order Exp-Golomb (EGk) binarization, and k-th order Exp-Golomb binarization. Examples of the entropy encoding algorithm include, but are not limited to, a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding, or other entropy encoding techniques. The entropy-coded data is added to the bitstream of the output encoded video 132.

As discussed above, reconstructed blocks 136 from neighboring blocks are used in the intra-prediction of blocks of a picture. Generating the reconstructed block 136 of a block involves calculating the reconstructed residuals of this block. The reconstructed residual can be determined by applying inverse quantization and inverse transform to the quantized residual of the block. The inverse quantization module 118 is configured to apply the inverse quantization to the quantized samples to obtain de-quantized coefficients. The inverse quantization module 118 applies the inverse of the quantization scheme applied by the quantization module 115 by using the same quantization step size as the quantization module 115. The inverse transform module 119 is configured to apply the inverse transform of the transform applied by the transform module 114 to the de-quantized samples, such as inverse DCT or inverse DST. The output of the inverse transform module 119 is the reconstructed residuals for the block in the pixel domain. The reconstructed residuals can be added to the prediction block 134 of the block to obtain a reconstructed block 136 in the pixel domain. For blocks where the transform is skipped, the inverse transform module 119 is not applied to those blocks. The de-quantized samples are the reconstructed residuals for the blocks.

Blocks in subsequent pictures following the first intra-predicted picture can be coded using either inter prediction or intra prediction. In inter-prediction, the prediction of a block in a picture is from one or more previously encoded video pictures. To perform inter prediction, the video encoder 100 uses an inter prediction module 124. The inter prediction module 124 is configured to perform motion compensation for a block based on the motion estimation provided by the motion estimation module 122.

The motion estimation module 122 compares a current block 104 of the current picture with decoded reference pictures 108 for motion estimation. The decoded reference pictures 108 are stored in a decoded picture buffer 130. The motion estimation module 122 selects a reference block from the decoded reference pictures 108 that best matches the current block. The motion estimation module 122 further identifies an offset between the position (e.g., x, y coordinates) of the reference block and the position of the current block. This offset is referred to as the motion vector (MV) and is provided to the inter prediction module 124 along with the selected reference block. In some cases, multiple reference blocks are identified for the current block in multiple decoded reference pictures 108. Therefore, multiple motion vectors are generated and provided to the inter prediction module 124 along with the corresponding reference blocks.

The inter prediction module 124 uses the motion vector(s) along with other inter-prediction parameters to perform motion compensation to generate a prediction of the current block, i.e., the inter prediction block 134. For example, based on the motion vector(s), the inter prediction module 124 can locate the prediction block(s) pointed to by the motion vector(s) in the corresponding reference picture(s). If there is more than one prediction block, these prediction blocks are combined with some weights to generate a prediction block 134 for the current block.

For inter-predicted blocks, the video encoder 100 can subtract the inter-prediction block 134 from block 104 to generate the residual block 106. The residual block 106 can be transformed, quantized, and entropy coded in the same way as the residuals of an intra-predicted block discussed above. Likewise, the reconstructed block 136 of an inter-predicted block can be obtained through inverse quantizing, inverse transforming the residual, and subsequently combining with the corresponding prediction block 134.

To obtain the decoded picture 108 used for motion estimation, the reconstructed block 136 is processed by an in-loop filter module 120. The in-loop filter module 120 is configured to smooth out pixel transitions thereby improving the video quality. The in-loop filter module 120 may be configured to implement one or more in-loop filters, such as a de-blocking filter, a sample-adaptive offset (SAO) filter, an adaptive loop filter (ALF), etc.

Figure 2:
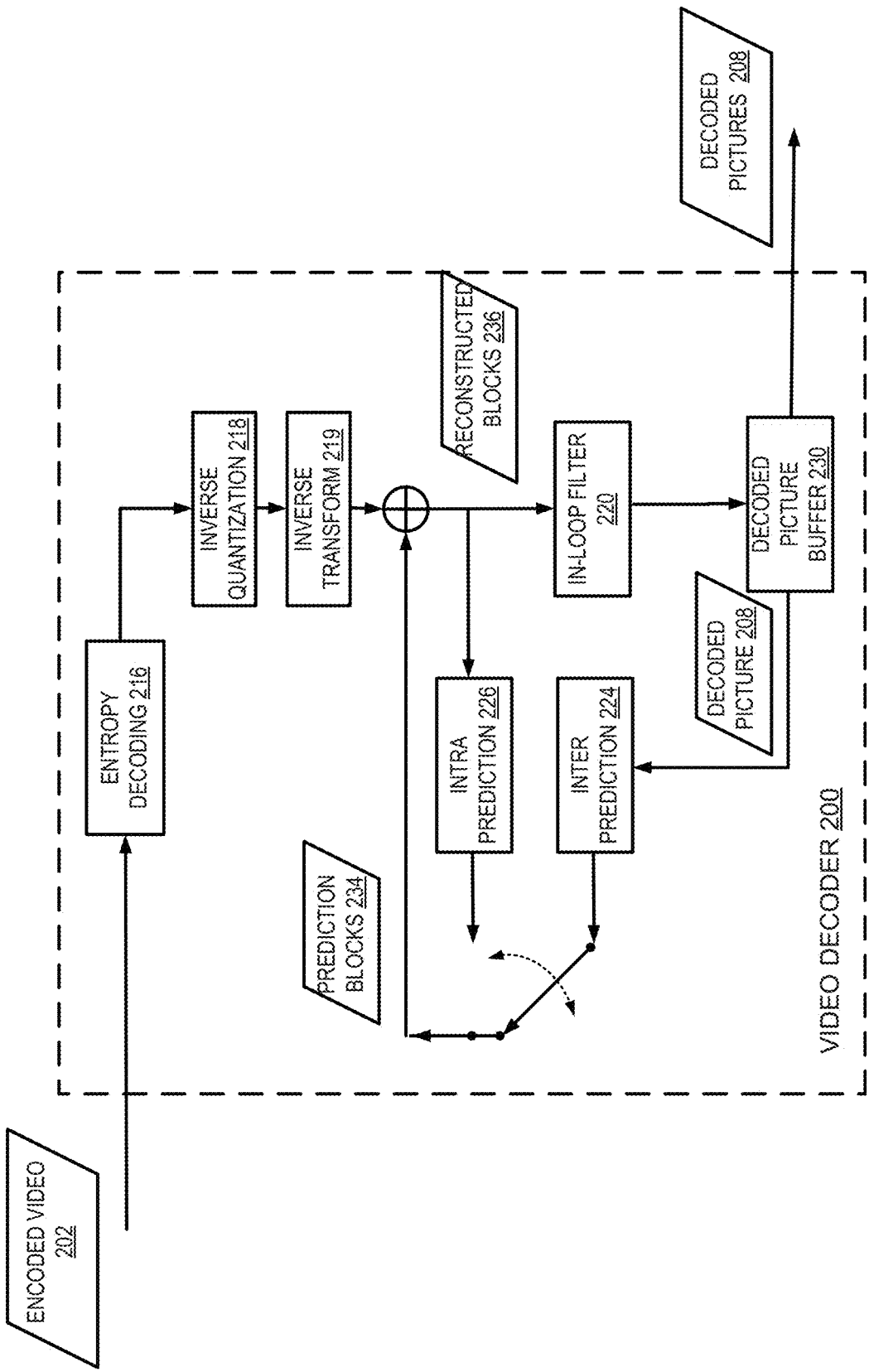
FIG. 2 is a block diagram showing an example of a video decoder configured to implement embodiments presented herein.

FIG. 2 depicts an example of a video decoder 200 configured to implement the embodiments presented herein. The video decoder 200 processes an encoded video 202 in a bitstream and generates decoded pictures 208. In the example shown in FIG. 2, the video decoder 200 includes an entropy decoding module 216, an inverse quantization module 218, an inverse transform module 219, an in-loop filter module 220, an intra prediction module 226, an inter prediction module 224, and a decoded picture buffer 230.

The entropy decoding module 216 is configured to perform entropy decoding of the encoded video 202. The entropy decoding module 216 decodes the quantized coefficients, coding parameters including intra prediction parameters and inter prediction parameters, and other information. In some examples, the entropy decoding module 216 decodes the bitstream of the encoded video 202 to binary representations and then converts the binary representations to quantization levels of the coefficients. The entropy-decoded coefficient levels are then inverse quantized by the inverse quantization module 218 and subsequently inverse transformed by the inverse transform module 219 to the pixel domain. The inverse quantization module 218 and the inverse transform module 219 function similarly to the inverse quantization module 118 and the inverse transform module 119, respectively, as described above with respect to FIG. 1. The inverse-transformed residual block can be added to the corresponding prediction block 234 to generate a reconstructed block 236. For blocks where the transform is skipped, the inverse transform module 219 is not applied to those blocks. The de-quantized samples generated by the inverse quantization module 118 are used to generate the reconstructed block 236.

The prediction block 234 of a particular block is generated based on the prediction mode of the block. If the coding parameters of the block indicate that the block is intra predicted, the reconstructed block 236 of a reference block in the same picture can be fed into the intra prediction module 226 to generate the prediction block 234 for the block. If the coding parameters of the block indicate that the block is inter-predicted, the prediction block 234 is generated by the inter prediction module 224. The intra prediction module 226 and the inter prediction module 224 function similarly to the intra prediction module 126 and the inter prediction module 124 of FIG. 1, respectively.

As discussed above with respect to FIG. 1, the inter prediction involves one or more reference pictures. The video decoder 200 generates the decoded pictures 208 for the reference pictures by applying the in-loop filter module 220 to the reconstructed blocks of the reference pictures. The decoded pictures 208 are stored in the decoded picture buffer 230 for use by the inter prediction module 224 and also for output.

Figure 3:
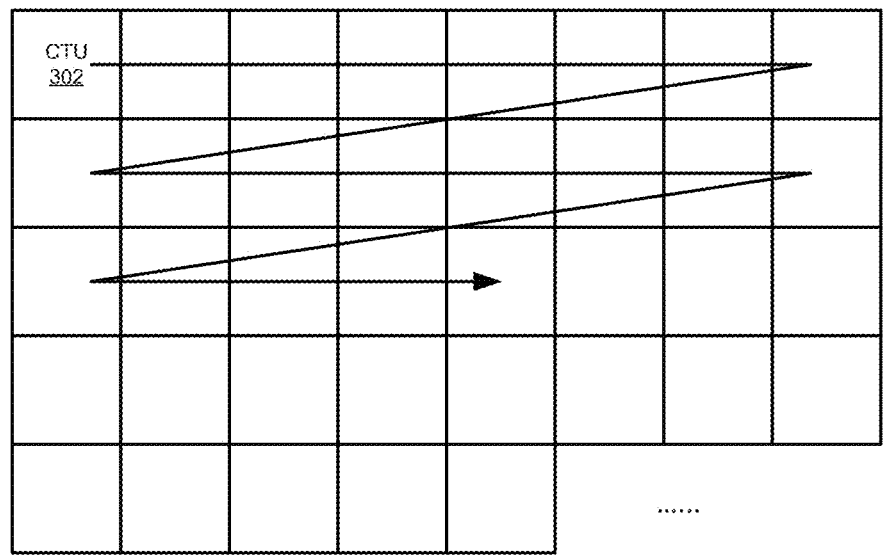
FIG. 3 depicts an example of a coding tree unit division of a picture in a video, according to some embodiments of the present disclosure.
Figure 4:
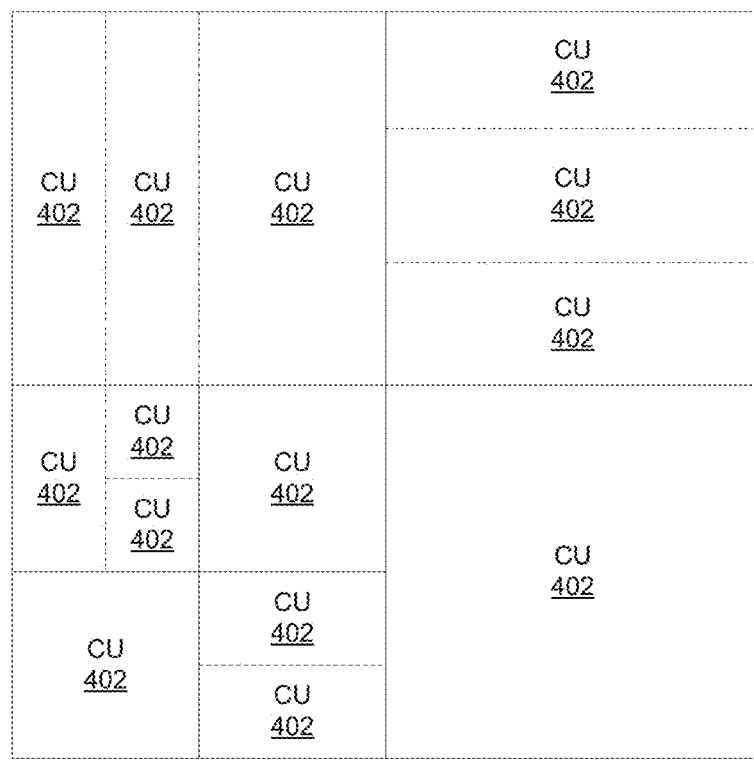
FIG. 4 depicts an example of a coding unit division of a coding tree unit, according to some embodiments of the present disclosure.

Referring now to FIG. 3, FIG. 3 depicts an example of a coding tree unit division of a picture in a video, according to some embodiments of the present disclosure. As discussed above with respect to FIGS. 1 and 2, to encode a picture of a video, the picture is divided into blocks, such as the CTUs (Coding Tree Units) 302 in VVC, as shown in FIG. 3. For example, the CTUs 302 can be blocks of 128×128 pixels. The CTUs are processed according to an order, such as the order shown in FIG. 3. In some examples, each CTU 302 in a picture can be partitioned into one or more CUs (Coding Units) 402 as shown in FIG. 4, which can be further partitioned into prediction units or transform units (TUs) for prediction and transformation. Depending on the coding schemes, a CTU 302 may be partitioned into CUs 402 differently. For example, in VVC, the CUs 402 can be rectangular or square, and can be coded without further partitioning into prediction units or transform units. Each CU 402 can be as large as its root CTU 302 or be subdivisions of a root CTU 302 as small as 4×4 blocks. As shown in FIG. 4, a division of a CTU 302 into CUs 402 in VVC can be quadtree splitting or binary tree splitting or ternary tree splitting. In FIG. 4, solid lines indicate quadtree splitting and dashed lines indicate binary or ternary tree splitting.

Motion Compensation

A tool employed in the hybrid video coding system, such as VVC and HEVC, is the prediction of video pixels or samples in a current frame to be decoded using pixels or samples from other frames which have already been reconstructed. Coding tools following this architecture are commonly referred to as "inter-prediction" tools, and the reconstructed frames may be called "reference frames." For stationary video scenes, inter-prediction for pixels or samples in the current frame can be achieved by decoding and using the collocated pixels or samples from the reference frames. However, video scenes containing motion necessitate the use of inter-prediction tools with motion compensation. For example, a current block of samples in the current frame may be predicted from a "prediction block" of samples from the reference frame, which is determined by firstly decoding a "motion vector" that signals the position of the prediction block in the reference frame relative to the position of the current block in the current frame. More sophisticated inter-prediction tools are used to exploit video scenes with complex motion, such as occlusion, or affine motion.

Interpolation

In cases where the position of the prediction block relative to the position of the current block is expressed in integer number of samples, the prediction block samples may be obtained directly from the corresponding sample positions in the reference frame. However, in general it is likely that the actual motion in the scene is equivalent to a non-integer number of samples. In such cases a prediction block may be determined using fractional pixel (fractional-pel) motion compensation. To determine the prediction blocks samples, the value of samples at the desired fractional-pel positions are interpolated from available samples at integer-pel positions. The interpolation method is selected by balancing design requirements including complexity, motion vector precision, interpolation error, and robustness to noise. Despite these trade-offs, prediction from interpolated prediction blocks utilising fractional-pel motion compensation has been found to be advantageous compared to only allowing prediction blocks with integer-pel motion compensation.

For ease of computation, most interpolation methods may be implemented by convolution of the available reference frame samples with a linear, shift-invariant set of coefficients. Such an operation is also known as filtering. Video coding standards have typically implemented interpolation of the two-dimensional prediction block by the separable application of one-dimensional filtering in the vertical and horizontal directions. To allow signaling of the motion vector information, motion vectors are typically limited to a multiple of a fractional-pel precision. For example, motion vectors for luma prediction may be limited to a multiple of ¼th pel precision.

In the interpolation paradigm described above, determination of the prediction block samples is governed by a limited set of interpolation filters. For the example of 1/16th pel precision, the total number of filters required for luma interpolation would be 16. The individual filters in the filter set may be referred to by their phases, which can be numbered from 0 to P−1 for a filter set designed for 1/P pel precision. The individual filters in a filter set H can be labelled as $h_0, h_1, \ldots h_{P-1}$. For regularity of implementation, each of the filters typically has the same length N. The filter length may also be referred to as the support of the filter. The individual filter coefficients, which may also be referred to as taps, are related to a particular filter at phase k by:

$$h_k = \{h_k[0], h_k[1], \ldots h_k[N-1]\}. \tag{1}$$

The definition of an interpolation process for the prediction block can be simplified to the design of a fixed set of P interpolation filters, each with N coefficients. Furthermore, a number of these filters are redundant. Consider that interpolating with the $h_{P-1}$ filter is equivalent to interpolating with a hypothetical $h_{-1}$ filter (that is, a filter with phase −1) but over a support that is shifted forward by one pixel. Further, the $h_{-1}$ filter may be implemented by the mirror image of the $h_1$ filter. Therefore, the filter design requirements can be further simplified to designing the set of filters with phase 0 through to P/2. The remaining filters may be defined in terms of the first P/2 phases:

$$h_0 = \{h_k[0], h_k[1], \ldots h_k[N-1]\} \tag{2}$$
$$h_1 = \{h_1[0], h_1[1], \ldots h_1[N-1]\}$$
$$\vdots$$
$$h_{\frac{P}{2}} = \left\{h_{\frac{P}{2}}[0], h_{\frac{P}{2}}[1], \ldots h_{\frac{P}{2}}[N-1]\right\}$$
$$\vdots$$
$$h_{P-2} = \{h_2[N-1], h_2[N-2], \ldots h_2[0]\}$$
$$h_{P-1} = \{h_1[N-1], h_1[N-2], \ldots h_1[0]\}$$

The filter design method selected is dependent on the trade-offs under consideration for a particular video standard. For example, in studies leading up to the design of the AVC standard it was empirically found that typical video content of that period contained noise resulting from imperfect video capture equipment. Such noise was typically of high spatial frequency and may have resulted from insufficient sensor sensitivity in low light conditions, or insufficient sensor resolution. Video content with a large noise component makes the task of prediction more difficult, and thus robustness to noise was an important factor in the design of interpolation filters for AVC. The half-pel interpolation filter adopted for AVC is based on a Wiener filter design, which assumes that the video signal contains a noise component resulting from aliasing during video capture.

Contemporary video content is generally of much higher quality, and in current filter designs for motion compensation, it is assumed that the noise from video capture is negligible. Furthermore, "noise" that may result from inaccurate motion modelling is substantially reduced due to the adoption of more sophisticated inter-prediction tools in modern video codecs. Therefore, in current video codecs the filter design trade-offs are less concerned with robustness to noise and more concerned with minimizing the interpolation error. For example, in post-VVC exploratory experiments, interpolation filters based upon a windowed sinc filter design are used.

Filter design based on the sinc function is founded upon an assumption that the video signal x[n] is a discrete sampling of a bandlimited continuous video function x(s). In this context, bandlimited refers to the Fourier transform of the continuous video signal x(s) having a magnitude of zero for spatial frequencies outside of the range $[-\pi,\pi]$. If such assumption is true, then the ideal interpolator for phase k has a Fourier response of $$e^{\frac{-j\omega k}{P}}.$$

In the spatial domain, the ideal interpolator is discrete samplings of the spatially shifted function $$sinc\left(s - \frac{k}{P}\right)$$

function, where sinc(·) is defined by the normalised variant of the sinc function as $$sinc(s) = \begin{cases} \frac{\sin(\pi s)}{\pi s} & s \neq 0 \\ 1 & s = 0 \end{cases} \quad (3)$$

However, the ideal interpolator cannot be implemented in a practical video codec because the sinc function has infinite support. To generate finite support filters, the windowed sinc approach multiplies the sinc function by a window function w(s) which is zero outside the desired finite support. For example, a cosine window function as shown below may be used:

$$w(s) = \begin{cases} 0 & x < -\frac{N}{2} \\ \cos\left(\frac{s\pi}{N}\right) & -\frac{N}{2} \leq x \leq \frac{N}{2} \\ 0 & x > \frac{N}{2} \end{cases} \quad (4)$$

A windowed sinc function has a Fourier response that is the convolution of the ideal interpolator with the Fourier response of the window function:

$$e^{-\frac{j\omega k}{P}} * \hat{w}(\omega).$$

While the windowed sinc function is no longer the ideal interpolator, careful selection of the window function can result in interpolation filters reasonably close to the ideal interpolator in frequency response.

Integerization

Filter design methods typically generate filters with floating-point filter coefficients. For example, the windowed sinc design method described above may be used to generate filter coefficients as follows:

$$h_0 = \left\{sinc\left(-\frac{N}{2}+1\right)w\left(-\frac{N}{2}+1\right),\right. \quad (5)$$

$$\left.sinc\left(-\frac{N}{2}+2\right)w\left(-\frac{N}{2}+2\right), \ldots sinc\left(\frac{N}{2}\right)w\left(\frac{N}{2}\right)\right\}$$

$$\vdots$$

$$h_k =$$

$$\left\{sinc\left(-\frac{N}{2}+1-\frac{k}{P}\right)w\left(-\frac{N}{2}+1-\frac{k}{P}\right), \ldots sinc\left(\frac{N}{2}-\frac{k}{P}\right)w\left(\frac{N}{2}-\frac{k}{P}\right)\right\}$$

Floating point calculations are undesirable for practical video coders because floating point operations may produce different results across different computing architectures. Such instability in floating point operations limits the interoperability of a video coding standard. Floating point operations are also more computationally expensive than integer multiplications. A such, to implement a filter set designed by such methods in a practical video coding standard, it is necessary to convert the floating-point filter coefficients to a fixed-point representation with a desired number of bits F. Filtering by fixed-point precision filters may be equivalently performed on hardware with integer multiplications and bit shift operations as shown below:

$$x * h_k = \left(x * h_k^{int} + (1 \ll (F-1))\right) \gg F \quad (6)$$

where * represents the convolution operation, and $h_k^{int}$ is a scaled and integerized representation that may approximately be determined by the following calculation:

$$h_k^{int} = \text{round}\left(h_k \times 2^F\right) \quad (7)$$

where round $(x)$ = Sign $(x)$ * Floor (Abs$(x)$ + 0.5) and $$\text{Sign}(x) = \begin{cases} 1 & ; \ x > 0 \\ 0 & ; \ x == 0 \\ -1 & ; \ x < 0 \end{cases} \quad (8)$$

However, this approximate integerization leads to poor coding performance because in the process of integerization, some desirable properties of the filter may be lost. For example, one desirable property is that when the interpolation filter acts on a constant signal x[n]=u, the output of the interpolation filter is u. Such property is equivalent to requiring that the frequency response of the interpolation filter has a "DC gain" of 1. The DC gain is equal to the sum of the fixed-point filter coefficients. In the integerized representation, the DC gain constraint can be equivalently satisfied by requiring that $$\sum_n h_k^{int}[n] = 2^F \quad (9)$$

The DC gain constraint may be achieved by manual adjustment of the integerized filter coefficients. While the DC gain constraint can be satisfied to ensure that one desirable property of interpolation filters is preserved, other desirable properties may also be prioritised by the integerization method. For example, as the ideal interpolator has a Fourier response of $$e^{\frac{-j\omega k}{P}},$$

the ideal phase response is correspondingly $$\frac{-j\omega k}{P}$$

which has a linear relationship with the angular frequency ω. Linearity of the phase response particularly over low frequencies is a desirable property to preserve in the integerized filters. Existing integerization methods do not take into account these properties and thus these properties may be lost through the integerization.

Figure 5:
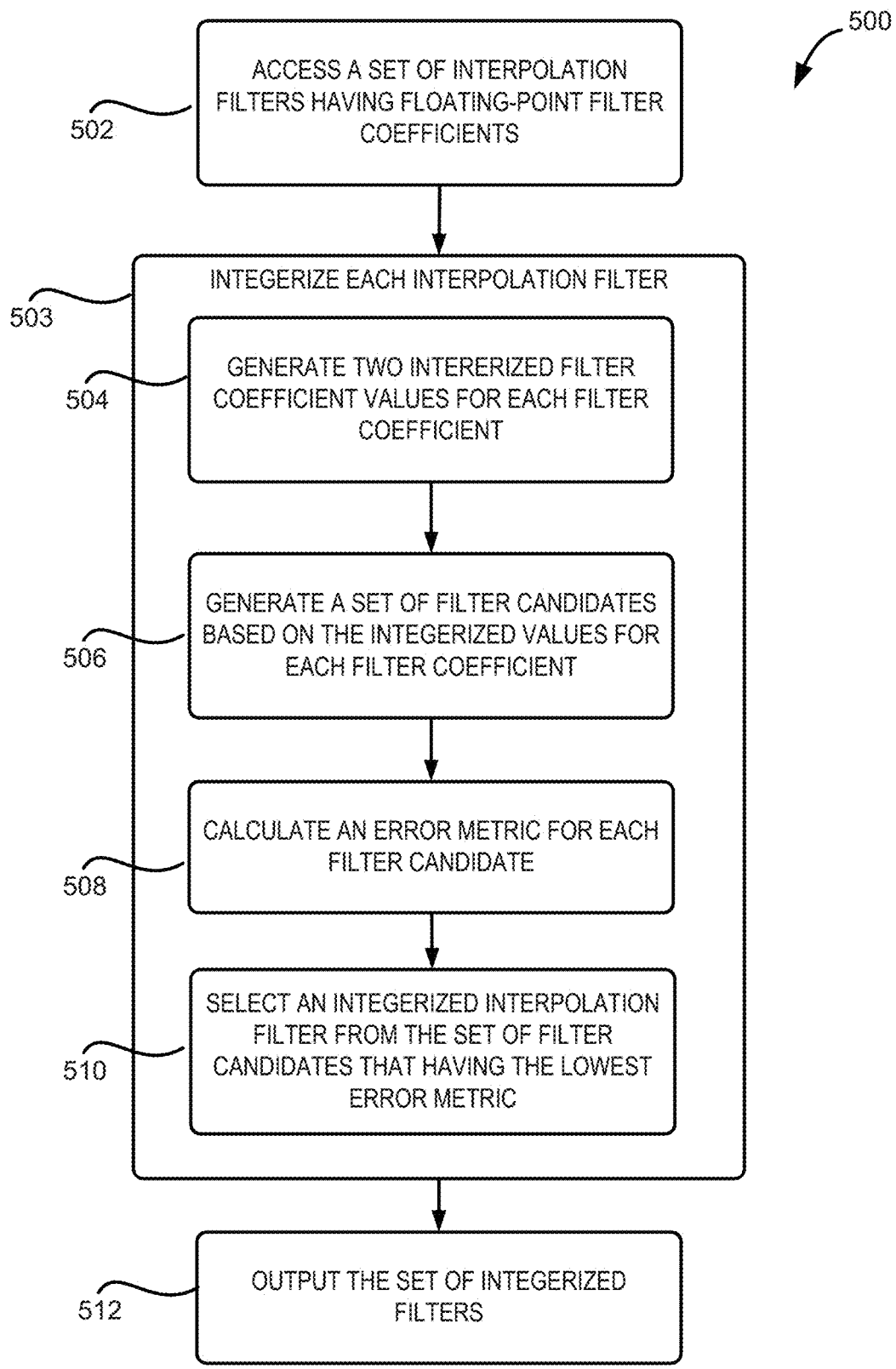
FIG. 5 depicts an example of a process for generating integerized interpolation filters, according to some embodiments of the present disclosure.

To solve these problems, integerization methods with minimized interpolation error are presented herein. The integerization methods work for any filter design method that produces a set of P filters with length N and floating-point filter coefficients, such as the windowed sinc method described above. FIG. 5 illustrates an example of a process 500 for generating integerized interpolation filters, according to some embodiments of the present disclosure. One or more computing devices (e.g., the computing device implementing the video encoder 100 or another computing device) implement operations depicted in FIG. 5 by executing suitable program code.

At block 502, the process 500 involves accessing a set of interpolation filters, such as a set of P filters with length N. Each of the set of interpolation filters has floating-point filter coefficients. In some examples, the integerization method may be simplified by setting $h_0^{int}=\{0, \ldots 2^F, \ldots, 0\}$ as the phase 0 filter is already the ideal interpolator, and $$h_{P-k}^{int} = \{h_k^{int}[N-1], h_k^{int}[N-2], \ldots h_k^{int}[0]\} \text{ for } k \in \left[1, \frac{P}{2}-1\right].$$

In this way, only filter coefficients from filters with phase 1, 2 . . . , P/2 are to be integerized. P can be any integer value between 4 to 64.

At block 503, which includes blocks 504-510, the process 500 involves processing each interpolation filter in the set of interpolation filters to generate the integerized interpolation filters. At block 504, the process 500 involves generating two integerized filter coefficient values for each filter coefficient of the interpolation filter. For example, for each filter coefficient, the largest integer value that is smaller than the filter coefficient scaled by a particular value (e.g., ceil($h_k$[i]×$2^F$)) and the smallest integer value that is larger than the filter coefficient scaled by the particular value (e.g., floor($h_k$[i]×$2^F$) can be generated. Here, F is the desired number of bits for the fixed-point representation of the interpolation filter. In some examples, F can be any integer number in the range of 6 to 12.

At block 506, the process 500 involves generating a set of filter candidates based on the two integerized values for each filter coefficient. For example, for filter $h_k$, an initial set of $2^N$ filter candidates $\{h_k^0, \ldots, h_k^{2^N-1}\}$ can be generated by enumerating possible integerized filter coefficients using one of the two integerized filter coefficient values for each coefficient. The filter candidates can be represented as:

$$h_k^0 = \{\text{floor}(h_k[0]\times 2^F), \text{floor}(h_k[1]\times 2^F), \ldots \text{floor}(h_k[N-1]\times 2^F)\} \quad (10)$$

$$h_k^1 = \{\text{ceil}(h_k[0]\times 2^F), \text{floor}(h_k[1]\times 2^F), \ldots \text{floor}(h_k[N-1]\times 2^F)\}$$

$$h_k^2 = \{\text{floor}(h_k[0]\times 2^F), \text{ceil}(h_k[1]\times 2^F), \ldots \text{floor}(h_k[N-1]\times 2^F)\}$$

$$h_k^3 = \{\text{ceil}(h_k[0]\times 2^F), \text{ceil}(h_k[1]\times 2^F), \ldots \text{floor}(h_k[N-1]\times 2^F)\}$$

$$\vdots$$

$$h_k^{2^N-1} = \{\text{ceil}(h_k[0]\times 2^F), \text{ceil}(h_k[1]\times 2^F), \ldots \text{ceil}(h_k[N-1]\times 2^F)\}$$

For typical interpolation filter lengths, the number of filter candidates generated is large but not unmanageable. For example, if N=12, then each floating point filter results in an initial set of 4096 filter candidates. Here, N can be any integer number between 4 and 16.

Each filter candidate is tested for the DC gain constraint. If a filter candidate does not satisfy the DC gain constraint ($\Sigma_n h_k^c[n] \neq 2^F$), then that filter candidate is discarded from the set. The remaining set of filter candidates are then evaluated according to an error metric.

At block 508, the process 500 involves calculating an error metric for each filter candidate in the set of filter candidates as described below. At block 510, the process 500 involves selecting an integerized interpolation filter with the lowest error metric from the set of filter candidates as the integerization for the filter $h_k$. The process is repeated for each filter until all integerizations for filters phase 1, 2, . . . , P/2 are selected. At block 512, the integerized set of interpolation filters are output for use in video encoding and decoding.

In one embodiment, the error metric is the squared error of the integerized filter coefficients from the scaled floating-point coefficients, that is, $E_k^c = \Sigma_{n=0}^{N-1}(h_k d^c[n] - h_k[n] \times 2^F)^2$, where c=0, . . . , $2^N-1$. The advantage of this error metric is that without the DC gain constraint, optimizing for this error metric is equivalent to rounding to the closest integer for each filter coefficient.

In one example of this embodiment, for a windowed sinc filter design with cosine window, P=32, N=6, and F=8, the integerized filter coefficients are:

| Filter phase | Interpolated position | Filter coefficients |
|---|---|---|
| 0 | 0/32 | {0, 0, 256, 0, 0, 0} |
| 1 | 1/32 | {2, −7, 256, 7, −2, 0} |
| 2 | 2/32 | {4, −13, 254, 15, −4, 0} |
| 3 | 3/32 | {5, −18, 252, 23, −7, 1} |
| 4 | 4/32 | {6, −23, 249, 32, −9, 1} |
| 5 | 5/32 | {8, −27, 245, 41, −12, 1} |
| 6 | 6/32 | {9, −31, 240, 51, −15, 2} |
| 7 | 7/32 | {9, −34, 235, 61, −17, 2} |
| 8 | 8/32 | {10, −37, 229, 71, −20, 3} |
| 9 | 9/32 | {10, −38, 222, 82, −23, 3} |
| 10 | 10/32 | {11, −40, 214, 92, −25, 4} |
| 11 | 11/32 | {11, −41, 206, 103, −28, 5} |
| 12 | 12/32 | {10, −41, 197, 114, −30, 6} |
| 13 | 13/32 | {10, −41, 188, 125, −33, 7} |
| 14 | 14/32 | {10, −40, 178, 136, −35, 7} |
| 15 | 15/32 | {9, −39, 168, 147, −37, 8} |
| 16 | 16/32 | {9, −38, 157, 157, −38, 9} |
| 17 | 17/32 | {8, −37, 147, 168, −39, 9} |
| 18 | 18/32 | {7, −35, 136, 178, −40, 10} |
| 19 | 19/32 | {7, −33, 125, 188, −41, 10} |
| 20 | 20/32 | {6, −30, 114, 197, −41, 10} |
| 21 | 21/32 | {5, −28, 103, 206, −41, 11} |
| 22 | 22/32 | {4, −25, 92, 214, −40, 11} |
| 23 | 23/32 | {3, −23, 82, 222, −38, 10} |
| 24 | 24/32 | {3, −20, 71, 229, −37, 10} |
| 25 | 25/32 | {2, −17, 61, 235, −34, 9} |
| 26 | 26/32 | {2, −15, 51, 240, −31, 9} |
| 27 | 27/32 | {1, −12, 41, 245, −27, 8} |
| 28 | 28/32 | {1, −9, 32, 249, −23, 6} |
| 29 | 29/32 | {1, −7, 23, 252, −18, 5} |

-continued

| Filter phase | Interpolated position | Filter coefficients |
|---|---|---|
| 30 | 30/32 | {0, −4, 15, 254, −13, 4} |
| 31 | 31/32 | {0, −2, 7, 256, −7, 2} |

In another embodiment, the error metric is calculated by approximating the integral of the spectral error between the frequency response of the filter candidate and the frequency response of an ideal interpolator. The frequency response of the filter candidate can be determined by taking the Fourier transform (with some minor adjustment for the indexing convention used in this disclosure) as follows:

$$\hat{h}_k^c(\omega) = \frac{e^{j\omega\left(\frac{N}{2}-1\right)}}{2^F} \sum_{n=1}^{N} h_k^c[n] e^{-j\omega n} \quad (11)$$

and the error from the ideal interpolator can be calculated as:

$$e_k^c(\omega) = \hat{h}_k^c(\omega) - e^{-\frac{j\omega k}{P}}. \quad (12)$$

The error metric may be estimated as a summation of the spectral power over discrete samplings of the spatial frequency ω. Normalisation by the spatial frequency bin width may be neglected since only the relative size of the error metrics between the filter candidates is needed.

$$E_k^c = \sum_{\omega} |e_k^c(\omega)|^2 \quad (13)$$

In one example of this embodiment, for a windowed sinc filter design with cosine window, P=32, N=6, and F=8, the integerized filter coefficients are:

| Filter phase | Interpolated position | Filter coefficients |
|---|---|---|
| 0 | 0/32 | {0, 0, 256, 0, 0, 0} |
| 1 | 1/32 | {1, −6, 255, 8, −2, 0} |
| 2 | 2/32 | {3, −12, 254, 14, −4, 1} |
| 3 | 3/32 | {5, −18, 252, 23, −7, 1} |
| 4 | 4/32 | {7, −23, 248, 32, −9, 1} |
| 5 | 5/32 | {7, −27, 245, 41, −11, 1} |
| 6 | 6/32 | {8, −30, 240, 50, −14, 2} |
| 7 | 7/32 | {10, −34, 234, 60, −17, 3} |
| 8 | 8/32 | {10, −36, 228, 71, −20, 3} |
| 9 | 9/32 | {10, −38, 221, 81, −22, 4} |
| 10 | 10/32 | {10, −39, 213, 92, −25, 5} |
| 11 | 11/32 | {11, −40, 205, 103, −28, 5} |
| 12 | 12/32 | {11, −41, 196, 114, −30, 6} |
| 13 | 13/32 | {10, −41, 187, 125, −32, 7} |
| 14 | 14/32 | {10, −40, 177, 135, −34, 8} |
| 15 | 15/32 | {10, −39, 167, 146, −36, 8} |
| 16 | 16/32 | {9, −38, 157, 157, −38, 9} |
| 17 | 17/32 | {8, −36, 146, 167, −39, 10} |
| 18 | 18/32 | {8, −34, 135, 177, −40, 10} |
| 19 | 19/32 | {7, −32, 125, 187, −41, 10} |
| 20 | 20/32 | {6, −30, 114, 196, −41, 11} |
| 21 | 21/32 | {5, −28, 103, 205, −40, 11} |
| 22 | 22/32 | {5, −25, 92, 213, −39, 10} |
| 23 | 23/32 | {4, −22, 81, 221, −38, 10} |
| 24 | 24/32 | {3, −20, 71, 228, −36, 10} |
| 25 | 25/32 | {3, −17, 60, 234, −34, 10} |
| 26 | 26/32 | {2, −14, 50, 240, −30, 8} |
| 27 | 27/32 | {1, −11, 41, 245, −27, 7} |
| 28 | 28/32 | {1, −9, 32, 248, −23, 7} |
| 29 | 29/32 | {1, −7, 23, 252, −18, 5} |
| 30 | 30/32 | {1, −4, 14, 254, −12, 3} |
| 31 | 31/32 | {0, −2, 8, 255, −6, 1} |

In another embodiment, the error metric $E_k^c$ defined in Eqn. (13) from the above embodiment can be modified by applying an importance weighting function m(ω) to the error $e_k^c(\omega)$ from the ideal interpolator:

$$E_k^c = \sum_{\omega} m(\omega) |e_k^c(\omega)|^2 \quad (14)$$

The importance weighting function may model an average power spectral density of video signals, or an average power spectral density of prediction blocks selected for motion compensation. One feature typical of natural video signals is the existence of a "deadzone" at high spatial frequencies. That is, due to the use of antialiasing filters during video acquisition, the spectral power at high spatial frequencies is substantially attenuated. One example of a simple weighting function that models this feature is a constant function modified with a "deadzone" at high frequencies:

$$m(\omega) = \begin{cases} 1 & |\omega| < 0.7\pi \\ 0 & |\omega| \geq 0.7\pi \end{cases} \quad (15)$$

In one example of this embodiment, for a windowed sinc filter design with cosine window, P=32, N=6, F=8, and the weighting function m(ω) in Eqn. (15), the integerized filter coefficients are:

| Filter phase | Interpolated position | Filter coefficients |
|---|---|---|
| 0 | 0/32 | {0, 0, 256, 0, 0, 0} |
| 1 | 1/32 | {2, −7, 255, 8, −2, 0} |
| 2 | 2/32 | {4, −13, 254, 14, −4, 1} |
| 3 | 3/32 | {5, −19, 252, 23, −6, 1} |
| 4 | 4/32 | {7, −23, 248, 32, −9, 1} |
| 5 | 5/32 | {8, −28, 245, 41, −11, 1} |
| 6 | 6/32 | {9, −31, 240, 50, −14, 2} |
| 7 | 7/32 | {10, −34, 234, 60, −17, 3} |
| 8 | 8/32 | {10, −36, 228, 71, −20, 3} |
| 9 | 9/32 | {11, −39, 221, 81, −22, 4} |
| 10 | 10/32 | {11, −40, 213, 92, −25, 5} |
| 11 | 11/32 | {11, −40, 205, 103, −28, 5} |
| 12 | 12/32 | {11, −41, 196, 114, −30, 6} |
| 13 | 13/32 | {10, −41, 187, 125, −32, 7} |
| 14 | 14/32 | {10, −40, 177, 135, −34, 8} |
| 15 | 15/32 | {10, −39, 167, 146, −36, 8} |
| 16 | 16/32 | {9, −38, 157, 157, −38, 9} |
| 17 | 17/32 | {8, −36, 146, 167, −39, 10} |
| 18 | 18/32 | {8, −34, 135, 177, −40, 10} |
| 19 | 19/32 | {7, −32, 125, 187, −41, 10} |
| 20 | 20/32 | {6, −30, 114, 196, −41, 11} |
| 21 | 21/32 | {5, −28, 103, 205, −40, 11} |
| 22 | 22/32 | {5, −25, 92, 213, −40, 11} |
| 23 | 23/32 | {4, −22, 81, 221, −39, 11} |
| 24 | 24/32 | {3, −20, 71, 228, −36, 10} |
| 25 | 25/32 | {3, −17, 60, 234, −34, 10} |
| 26 | 26/32 | {2, −14, 50, 240, −31, 9} |
| 27 | 27/32 | {1, −11, 41, 245, −28, 8} |
| 28 | 28/32 | {1, −9, 32, 248, −23, 7} |
| 29 | 29/32 | {1, −6, 23, 252, −19, 5} |
| 30 | 30/32 | {1, −4, 14, 254, −13, 4} |
| 31 | 31/32 | {0, −2, 8, 255, −7, 2} |

In yet another embodiment, rather than selecting the filter candidate with lowest error metric value for a particular error metric, the set of filter candidates may be pruned down to a reduced set of filter candidates with lower errors than discarded filter candidates. Selection of the reduced set may be based on any of the error metrics discussed above. The reduced set of filter candidates for each of the phases may be tested in a full hybrid video coding system to select a filter candidate for each phase with the best rate-distortion result. The rate-distortion performance may be measured by the Bjontegaard metric calculated between a reference video coding system with unchanged filters and the tested video coding system with the candidate filters over a set of quantization parameter operating points.

Figure 6:
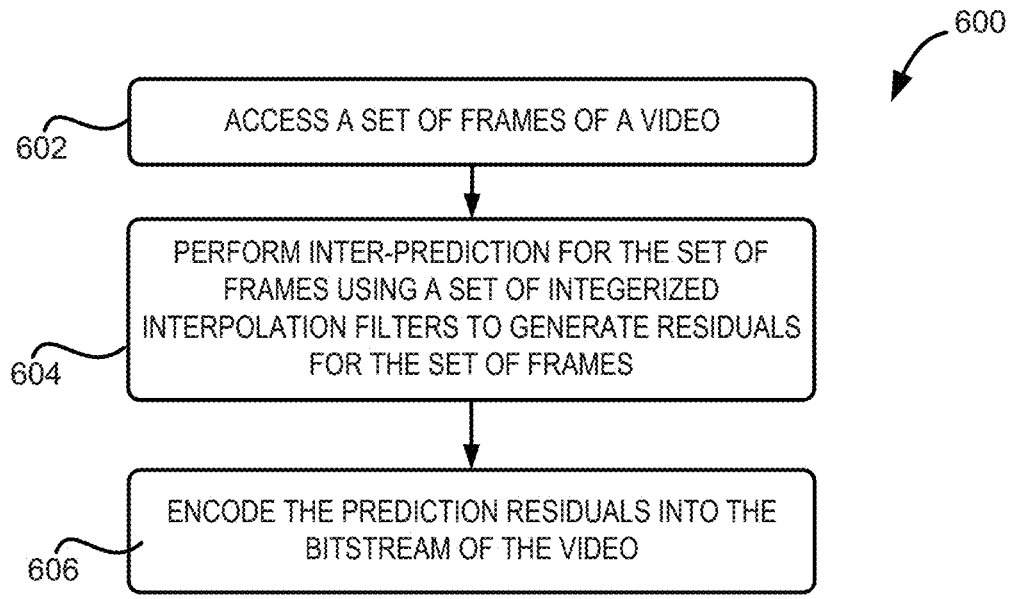
FIG. 6 depicts another example of a process for encoding a video, according to some embodiments of the present disclosure.

FIG. 6 depicts an example of a process 600 for encoding a video using integerized interpolation filters, according to some embodiments of the present disclosure. One or more computing devices (e.g., the computing device implementing the video encoder 100) implement operations depicted in FIG. 6 by executing suitable program code including, for example, the inter prediction module 124 and other modules. For illustrative purposes, the process 600 is described with reference to some examples depicted in the figures. Other implementations, however, are possible.

At block 602, the process 600 involves accessing a set of frames or pictures of a video signal. As discussed above with respect to FIG. 1, the set of frames of the video may be divided into blocks, such as coding units 402 discussed in FIG. 4 or any type of block processed by a video encoder as a unit when performing the inter prediction. At block 604, the process 600 involves performing inter prediction for the set of frames using a set of integerized interpolation filters to generate prediction residuals for the plurality of frames. In some examples, the set of integerized interpolation filters are generated through process 500 discussed above with regard to FIG. 5. As discussed above, the video encoder may use the set of integerized interpolation filters to calculate the inter-predicted values for a block and calculate the residual by subtracting the inter prediction from the samples of the block. At block 606, the process 600 involves encoding the prediction residuals for the set of frames into a bitstream representing the video. As discussed above in detail, the encoding can involve operations such as transformation, quantization, entropy coding of the prediction residuals. The coded bits of the prediction residuals can be included in the bitstream of the video along with other data.

Figure 7:
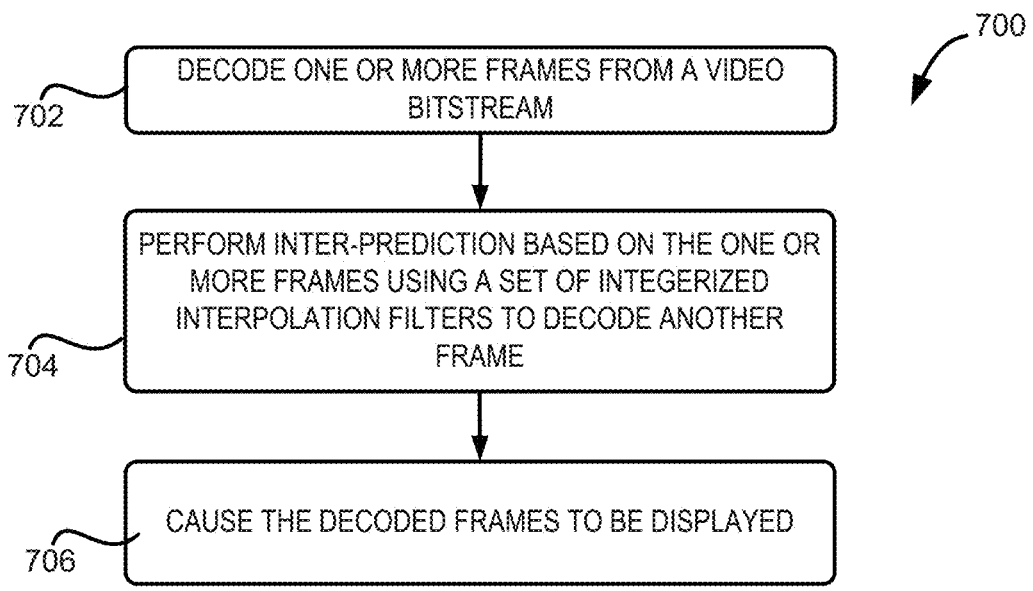
FIG. 7 depicts another example of a process for decoding a video, according to some embodiments of the present disclosure.

FIG. 7 depicts an example of a process 700 for decoding a video, according to some embodiments of the present disclosure. One or more computing devices implement operations depicted in FIG. 7 by executing suitable program code. For example, a computing device implementing the video decoder 200 may implement the operations depicted in FIG. 7 by executing the program code, including, for example, the inter prediction module 224. For illustrative purposes, the process 700 is described with reference to some examples depicted in the figures. Other implementations, however, are possible.

At block 702, the process 700 involves decoding one or more frames from a video bitstream, such as the encoded video 202. As discussed above, the decoding can involve entropy decoding, de-quantization, inverse transformation, and reconstructing blocks of the frames based on inter- or intra-predicted blocks. At block 704, the process 700 involves performing inter prediction based on the one or more frames using a set of integerized interpolation filters to decode another frame of the video. In some examples, the set of integerized interpolation filters are generated according to the process 500 described above with regard to FIG. 5. The inter prediction may be performed using the decoded one or more frames as reference frames and motion vectors decoded from the video bitstream as discussed above in detail. At block 706, the process 700 involves decoding the rest of the frames in the video into images. In some examples, the decoding is performed according to the process described above with respect to FIG. 2. The decoded video can be output for display.

Figure 8:
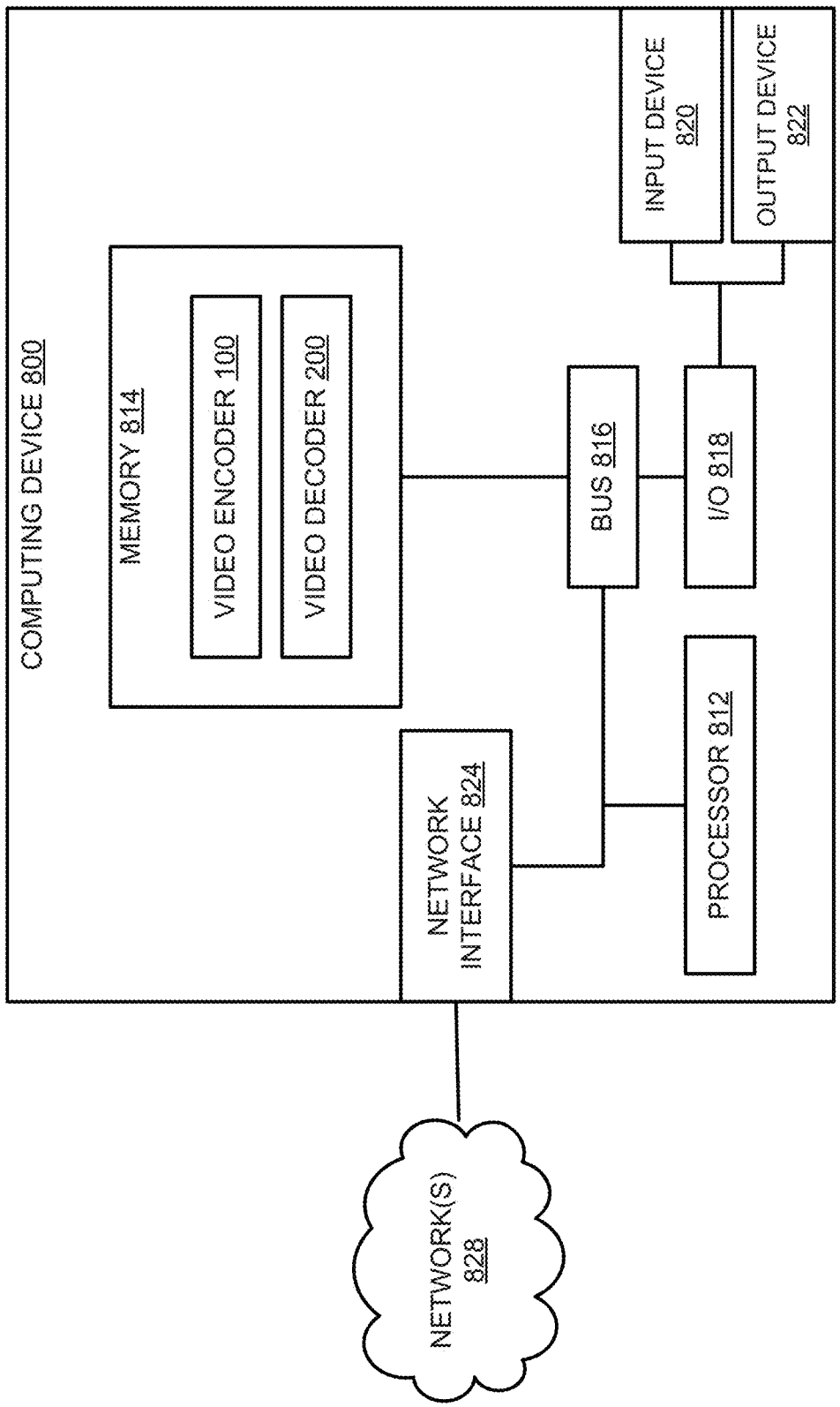
FIG. 8 depicts an example of a computing system that can be used to implement some embodiments of the present disclosure.

Computing System Example for Implementing Signaling General Constraints Information Any suitable computing system can be used for performing the operations described herein. For example, FIG. 8 depicts an example of a computing device 800 that can implement the video encoder 100 of FIG. 1 or the video decoder 200 of FIG. 2. In some embodiments, the computing device 800 can include a processor 812 that is communicatively coupled to a memory 814 and that executes computer-executable program code and/or accesses information stored in the memory 814. The processor 812 may comprise a microprocessor, an application-specific integrated circuit ("ASIC"), a state machine, or other processing device. The processor 812 can include any of a number of processing devices, including one. Such a processor can include or may be in communication with a computer-readable medium storing instructions that, when executed by the processor 812, cause the processor to perform the operations described herein.

The memory 814 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 can also include a bus 816. The bus 816 can communicatively couple one or more components of the computing device 800. The computing device 800 can also include a number of external or internal devices such as input or output devices. For example, the computing device 800 is shown with an input/output ("I/O") interface 818 that can receive input from one or more input devices 820 or provide output to one or more output devices 822. The one or more input devices 820 and one or more output devices 822 can be communicatively coupled to the I/O interface 818. The communicative coupling can be implemented via any suitable manner (e.g., a connection via a printed circuit board, connection via a cable, communication via wireless transmissions, etc.). Non-limiting examples of input devices 820 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 822 include an LCD screen, an external monitor, a speaker, or any other device that can be used to display or otherwise present outputs generated by a computing device.

The computing device 800 can execute program code that configures the processor 812 to perform one or more of the operations described above with respect to FIGS. 1-7. The program code can include the video encoder 100 or the video decoder 200. The program code may be resident in the memory 814 or any suitable computer-readable medium and may be executed by the processor 812 or any other suitable processor.

The computing device 800 can also include at least one network interface device 824. The network interface device 824 can include any device or group of devices suitable for establishing a wired or wireless data connection to one or more data networks 828. Non-limiting examples of the network interface device 824 include an Ethernet network adapter, a modem, and/or the like. The computing device 800 can transmit messages as electronic or optical signals via the network interface device 824.

GENERAL CONSIDERATIONS

Numerous details are set forth herein to provide a thorough understanding of the claimed subject matter. However, those skilled in the art will understand that the claimed subject matter may be practiced without these details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for encoding a video, the method comprising:
   accessing a plurality of frames of the video;
   performing inter prediction for the plurality of frames using a set of integerized interpolation filters to generate prediction residuals for the plurality of frames, wherein the set of integerized interpolation filters is generated by:
      accessing a set of interpolation filters, each of the set of interpolation filters having floating-point filter coefficients;
      for each interpolation filter in the set of interpolation filters,
      generating two integerized filter coefficient values for each filter coefficient of the interpolation filter,
      generating a set of filter candidates based on the two integerized filter coefficient values for each filter coefficient,
      calculating an error metric for each filter candidate in the set of filter candidates, and
      selecting an integerized interpolation filter for the interpolation filter from the set of filter candidates, the selected integerized interpolation filter having a lowest error metric among the set of filter candidates; and
   encoding the prediction residuals for the plurality of frames into a bitstream representing the video.

2. The method of claim 1, wherein the error metric is defined as a squared error of the integerized filter coefficients of the filter candidate from the corresponding floating-point filter coefficients scaled by a particular value.

3. The method of claim 1, wherein the error metric is calculated by approximating an integral of a spectral error between a first frequency response of the filter candidate and a second frequency response of an ideal interpolator.

4. The method of claim 3, wherein the error metric is further defined by applying weights to the spectral error.

5. The method of claim 1, wherein selecting the integerized interpolation filter from the set of filter candidates comprises:
   selecting a reduced set of filter candidates from the set of filter candidates, each filter candidate in the reduced set of filter candidates having an error metric lower than remaining filter candidates in the set of filter candidates; and
   determine a rate-distortion result for each of the reduced set of filter candidates by applying respective filter candidates in a video coding system, wherein the integerized interpolation filter is selected from the reduced set of filter candidates based on the rate-distortion results.

6. The method of claim 1, wherein two integerized filter coefficient values for each filter coefficient comprise a largest integer value that is smaller than the filter coefficient scaled by a particular value and a smallest integer value that is larger than the filter coefficient scaled by the particular value.

7. The method of claim 6, wherein the set of filter candidates comprise filter candidates having filter coefficients selected from the two integerized filter coefficient values of respective filter coefficients.

8. A non-transitory computer-readable medium having program code that is stored thereon, the program code executable by one or more processing devices for performing operations comprising:
 accessing a plurality of frames of a video;
 performing inter prediction for the plurality of frames using a set of integerized interpolation filters to generate prediction residuals for the plurality of frames, wherein the set of integerized interpolation filters is generated by:
  accessing a set of interpolation filters, each of the set of interpolation filters having floating-point filter coefficients;
  for each interpolation filter in the set of interpolation filters,
   generating two integerized filter coefficient values for each filter coefficient of the interpolation filter,
   generating a set of filter candidates based on the two integerized filter coefficient values for each filter coefficient,
   calculating an error metric for each filter candidate in the set of filter candidates, and
   selecting an integerized interpolation filter for the interpolation filter from the set of filter candidates, the selected integerized interpolation filter having a lowest error metric among the set of filter candidates; and
 encoding the prediction residuals for the plurality of frames into a bitstream representing the video.

9. The non-transitory computer-readable medium of claim 8, wherein the error metric is defined as a squared error of the integerized filter coefficients of the filter candidate from the corresponding floating-point filter coefficients scaled by a particular value.

10. The non-transitory computer-readable medium of claim 8, wherein the error metric is calculated by approximating an integral of a spectral error between a first frequency response of the filter candidate and a second frequency response of an ideal interpolator, and
 wherein the error metric is further defined by applying weights to the spectral error.

11. The non-transitory computer-readable medium of claim 8, wherein selecting the integerized interpolation filter from the set of filter candidates comprises:
 selecting a reduced set of filter candidates from the set of filter candidates, each filter candidate in the reduced set of filter candidates having an error metric lower than remaining filter candidates in the set of filter candidates; and
 determine a rate-distortion result for each of the reduced set of filter candidates by applying respective filter candidates in a video coding system, wherein the integerized interpolation filter is selected from the reduced set of filter candidates based on the rate-distortion results.

12. The non-transitory computer-readable medium of claim 8, wherein two integerized filter coefficient values for each filter coefficient comprise a largest integer value that is smaller than the filter coefficient scaled by a particular value and a smallest integer value that is larger than the filter coefficient scaled by the particular value.

13. The non-transitory computer-readable medium of claim 12, wherein the set of filter candidates comprise filter candidates having filter coefficients selected from the two integerized filter coefficient values of respective filter coefficients.

14. A method for decoding a video from a video bitstream, the method comprising:
 decoding one or more frames of the video from the video bitstream;
 performing inter prediction based on the one or more frames using a set of integerized interpolation filters to decode another frame of the video, wherein the set of integerized interpolation filters are generated by:
  accessing a set of interpolation filters, each of the set of interpolation filters having floating-point filter coefficients;
  for each interpolation filter in the set of interpolation filters,
   generating two integerized filter coefficient values for each filter coefficient of the interpolation filter,
   generating a set of filter candidates based on the two integerized filter coefficient values for each filter coefficient,
   calculating an error metric for each filter candidate in the set of filter candidates, and
   selecting an integerized interpolation filter for the interpolation filter from the set of filter candidates, the selected integerized interpolation filter having a lowest error metric among the set of filter candidates; and
 causing the decoded one or more frame and the decoded another frame to be displayed.

15. The method of claim 14, wherein the error metric is defined as a squared error of the integerized filter coefficients of the filter candidate from the corresponding floating-point filter coefficients scaled by a particular value.

16. The method of claim 14, wherein the error metric is calculated by approximating an integral of a spectral error between a first frequency response of the filter candidate and a second frequency response of an ideal interpolator.

17. The method of claim 16, wherein the error metric is further defined by applying weights to the spectral error.

18. The method of claim 14, wherein selecting the integerized interpolation filter from the set of filter candidates comprises:
 selecting a reduced set of filter candidates from the set of filter candidates, each filter candidate in the reduced set of filter candidates having an error metric lower than remaining filter candidates in the set of filter candidates; and
 determine a rate-distortion result for each of the reduced set of filter candidates by applying respective filter candidates in a video coding system, wherein the integerized interpolation filter is selected from the reduced set of filter candidates based on the rate-distortion results.

19. The method of claim 14, wherein two integerized filter coefficient values for each filter coefficient comprise a largest integer value that is smaller than the filter coefficient scaled by a particular value and a smallest integer value that is larger than the filter coefficient scaled by the particular value.

20. The method of claim 19, wherein the set of filter candidates comprise filter candidates having filter coefficients selected from the two integerized filter coefficient values of respective filter coefficients.

* * * * *